US010416738B2

(12) United States Patent
Eppensteiner et al.

(10) Patent No.: US 10,416,738 B2
(45) Date of Patent: Sep. 17, 2019

(54) METHOD FOR ADJUSTING PULL RESISTORS OF AN ELECTRONIC MODULE

(71) Applicant: Siemens Aktiengesellschaft, Munich (DE)

(72) Inventors: Friedrich Eppensteiner, Spitz (AT); Majid Ghameshlu, Vienna (AT); Martin Matschnig, Tulln (AT); Herbert Taucher, Moedling (AT)

(73) Assignee: Siemens Aktiengesellschaft, Munich (DE)

( * ) Notice: Subject to any disclaimer, the term of this patent is extended or adjusted under 35 U.S.C. 154(b) by 223 days.

(21) Appl. No.: 15/399,416

(22) Filed: Jan. 5, 2017

(65) Prior Publication Data

US 2017/0199555 A1 Jul. 13, 2017

(30) Foreign Application Priority Data

Jan. 12, 2016 (DE) .................. 10 2016 200 245

(51) Int. Cl.
| | |
|---|---|
| *G06F 1/24* | (2006.01) |
| *H03K 17/22* | (2006.01) |
| *G06F 21/70* | (2013.01) |
| *H03K 19/0175* | (2006.01) |
| *H03K 19/0185* | (2006.01) |
| *H03K 19/177* | (2006.01) |

(52) U.S. Cl.
CPC .............. *G06F 1/24* (2013.01); *G06F 21/70* (2013.01); *H03K 17/22* (2013.01); *H03K 19/01759* (2013.01); *H03K 19/018592* (2013.01); *H03K 19/1776* (2013.01)

(58) Field of Classification Search
CPC ............. H03K 17/22; H03K 19/01759; H03K 19/018592; H03K 19/1776; G06F 1/24; G06F 21/70
See application file for complete search history.

(56) References Cited

U.S. PATENT DOCUMENTS

| | | | |
|---|---|---|---|
| 7,170,313 B2 * | 1/2007 | Shin .................... | H04L 25/0278 326/30 |
| 7,619,444 B1 | 11/2009 | Shaikh et al. | |

(Continued)

FOREIGN PATENT DOCUMENTS

| | | |
|---|---|---|
| DE | 699 08 519 T2 | 12/2003 |
| DE | 102 43 603 A1 | 4/2004 |

*Primary Examiner* — Terrell S Johnson
(74) *Attorney, Agent, or Firm* — Cozen O'Connor

(57) ABSTRACT

A method for adjusting a pull resistor on a contact terminal of an electronic module arranged on a printed circuit board, in particular an ASIC, after initiating a restart of the electronic module which, during a run-up process, moves the electronic module from a switched-off state into a switched-on state, wherein after initiating a restart during the run-up process from a partial circuit arranged on the electronic module and operationally ready during the run-up process, adjustment information relating to a desired adjustment of the pull resistor is retrieved from a storage unit arranged on the printed circuit board outside of the electronic module and transmitted via a contact line between the electronic module and the storage unit, where the run-up process of the electronic module is only completed after successful adjustment of the respective pull resistor based on basis the retrieved adjustment information.

9 Claims, 2 Drawing Sheets

(56) References Cited

U.S. PATENT DOCUMENTS

| | | |
|---|---|---|
| 8,384,428 B1 | 2/2013 | Andrews et al. |
| 8,601,254 B1 * | 12/2013 | Kutz ................ H03K 19/01858 |
| | | 326/38 |
| 2005/0226080 A1 * | 10/2005 | Lee .......................... G11C 5/04 |
| | | 365/230.03 |
| 2006/0033541 A1 * | 2/2006 | Ishikawa ................... G06F 1/24 |
| | | 327/143 |
| 2008/0122499 A1 * | 5/2008 | Frew ......................... G06F 1/24 |
| | | 327/143 |
| 2011/0128038 A1 * | 6/2011 | Ko ........................... G11C 7/02 |
| | | 326/30 |

* cited by examiner

METHOD FOR ADJUSTING PULL RESISTORS OF AN ELECTRONIC MODULE

BACKGROUND OF THE INVENTION

1. Field of the Invention

The invention relates to a method for adjusting a pull resistor on a contact terminal of an electronic module, in particular an Application Specific Integrated Circuit (ASIC), arranged on a printed circuit board after initiating a restart of the electronic module which, during a run-up process, changes the electronic module from a switched-off state into a switched-on state.

2. Description of the Related Art

Electronic modules which, in most cases, form part of an electronic component group and which are soldered to a wiring support that is referred to herein as a printed circuit board (PCB). Here, they form a structural and generally also functional unit comprising integrated and/or discrete and passive components with the other components of the electronic component group, which are connected electrically and mechanically via a line network to the printed circuit board. Here, the electronic module includes a plurality of contact lines, which each extend from contact terminals of the electronic module, which comprise populated and unpopulated contact terminals due to the logical programming, via soldered connections to the printed circuit board. The contact lines are continued on the printed circuit board as conductor paths, where they can lead for instance to another electronic component, such as another electronic module or an interface module.

The signal and voltage supply terminals of the electronic module are understood to be contact terminals, which are connected via what are known as bond wires to the soldered connections to the printed circuit board. With Ball Grid Arrays (BGAs) and Flip-Chip Ball Grid Arrays (FCBGAs), the soldered connections are solder balls (balls), via which the BGA housing or the FCBGA housing is fastened to the printed circuit board. With Quad Flat Packages (QFPs), what are known as pins are soldered to the printed circuit board, which are each uniquely assigned to the contact terminals, where the terms "pins" and "balls" are in practice used interchangeably because, for instance, with ASICs the package can be, within certain limits, selected freely.

Within the module, the contact terminals are generally connected to input/output I/O buffers, which are arranged at the output of the electronic module and which drive the relevant contact line with its specific physical behavior.

On account of complex multiplex methods for different applications, electronic modules, in most cases, offer different interfaces on the same contact terminal ("Pin"), such as with an Serial Peripheral Interface (SPI) or with Universal Asynchronous Receiver/Transmitter (UART). On account of their I/O characteristics, in other words, whether they are operated exclusively as an input, exclusively as an output or bi-directionally, and the interface characteristics, i.e., depending on the interface protocol or low/high active operation, these various interfaces require a different protective circuit due to pull-up resistors or pull-down resistors. For financial reasons, these pull resistors are not integrated onto the circuit board but instead within the electronic module.

The adjustment of these resistors, i.e., the activation or deactivation of a pull-up resistor or a pull-down resistor at a particular contact terminal, can be changed by corresponding software registers in the electronic module as a function of the configuration of the pin multiplexing. In the case of a restart of the electronic module ("Reset"), such as during the switch-on process or when actuating a reset button, this adjustment is however again reset to an initial value ("default value") which is predetermined by default. A power-on reset, for example, is triggered by an internal reset circuit if the operating voltage drops below a limit value, and when the power supply is switched on. In particular, all I/O registers are also set to their initial value during a reset. The last current value for the activation or deactivation of a pull resistor at a contact terminal, which can also differ from the default value, is firstly lost until a desired adjustment of the pull resistors was/is performed again by the software of the electronic module. During the time period from the end of the run-up process until activation of a desired adjustment, an unwanted adjustment of a pull resistor is however sometimes active, which may result in malfunctions. In safety-critical applications, such a malfunction may be fatal.

Conventionally redundant pull resistors are therefore arranged on the printed circuit board depending on the application, with the pull resistors nevertheless resulting in additional costs.

SUMMARY OF THE INVENTION

It is therefore an object of the present invention to provide a method for adjusting pull resistors of an electronic module, which reliably prevents an unwanted adjustment of the pull resistors during a reset of the electronic module and in particular ensures that the pull resistors of the electronic module are already adjusted correctly immediately after the reset.

This and other objects and advantages are achieved in accordance with the invention by a method for adjusting a pull resistor on a contact terminal of an electronic module, i.e., an Application Specific Integrated Circuit (ASIC), arranged on a printed circuit board after initiating a restart of the electronic module which, during a run-up process, changes the electronic module from a switched-off state into a switched-on state. In accordance with the invention, after initiating the restart during the run-up process from a partial circuit that is arranged on the electronic module and that is operationally ready during the run-up process, adjustment information relating to a desired adjustment of the pull resistor is retrieved from a storage unit arranged on the printed circuit board outside of the electronic module and transmitted via a contact line between the electronic module and the storage unit, where the run-up process of the electronic module is only completed after successful adjustment of the respective pull resistor based on the retrieved adjustment information.

An external storage unit is thus provided, in which adjustment information relating to the desired adjustments of the pull resistors is stored. The electronic module accesses this storage unit during the run-up process and in this way obtains the desired adjustment information. The run-up process of the electronic module and the other components of the electronic component group, in particular possible interface modules, is extended for this purpose by the time required to transmit the adjustment information from the storage unit. The partial circuit of the electronic module which, for this purpose, communicates with the external storage unit is dismissed for this purpose earlier from the run-up process and is moved into an operationally ready state. The run-up process of the electronic module and other electronic components of the relevant component group is, however, only completed after successfully adjusting the respective pull resistors based on the retrieved adjustment information. If a number of pull resistors have to be adjusted for a plurality of contact terminals, then the run-up process is only completed after successful adjustment of all desired pull resistors based on the retrieved adjustment information.

The storage unit can be formed extremely simply because it is only required to contain the adjustment information for the pull resistors. Two bits are required to adjust the respective pull resistor. For transmission of the adjustment information, the storage unit includes a voltage supply and a functional I/O terminal, which is connected via a contact line to the electronic module. Provision is preferably made here, after initiating the restart, that an I/O terminal of the storage unit connected to the contact line to the electronic module is operated as an input during the run-up process and is operated as an output after receiving a command from the partial circuit of the electronic module for transmitting the adjustment information during the run-up process.

For retrieval and receipt of the adjustment information, after initiating the restart during the run-up process, a further contact terminal of the electronic module, which is connected to the contact line to the storage unit, is converted into an IO terminal.

In order to increase the functional safety of the method in accordance with the invention, a test value for the data of the adjustment information is additionally transmitted during transmission of the adjustment information, with which after the adjustment information has been retrieved by the electronic module, the error-free transmission and storage of the adjustment information is checked, where the run-up process is only completed with an error-free transmission and storage of the adjustment information. The determination and use of such test values is generally known, such as within the scope of a cyclic redundancy check (CRC). Prior to data storage and transmission of the data, additional redundancy in the form of the test value (CRC value) is added here for each data block of the data to be transmitted, for instance. This test value is calculated in accordance with a specific method. To verify the data, the same calculation method is applied to the data block including the added test value.

To safeguard against malicious tampering, the adjustment information is transmitted in an encrypted form and is authenticated between the storage unit and the electronic module, where the run-up process is only completed with an error-free decryption and authentication check of the adjustment information. One possibility exists, for instance, with the aid of a mode of operation, in which block ciphers can be operated for a symmetrical encryption application (Galois Counter Mode (GCM)). Here, an authenticated encryption mode with associated data is provided as an essential property to permit both the authentication and also the encryption of data. The mode of operation of a block cipher, such as "Advanced Encryption Standard (AES)", permits the encryption of data, here.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

To further explain the invention, reference is made in the following part of the description to the figures, from which further advantageous embodiments, details and developments of the invention can be inferred, in which.

DETAILED DESCRIPTION OF THE EXEMPLARY EMBODIMENTS

Figure 1:
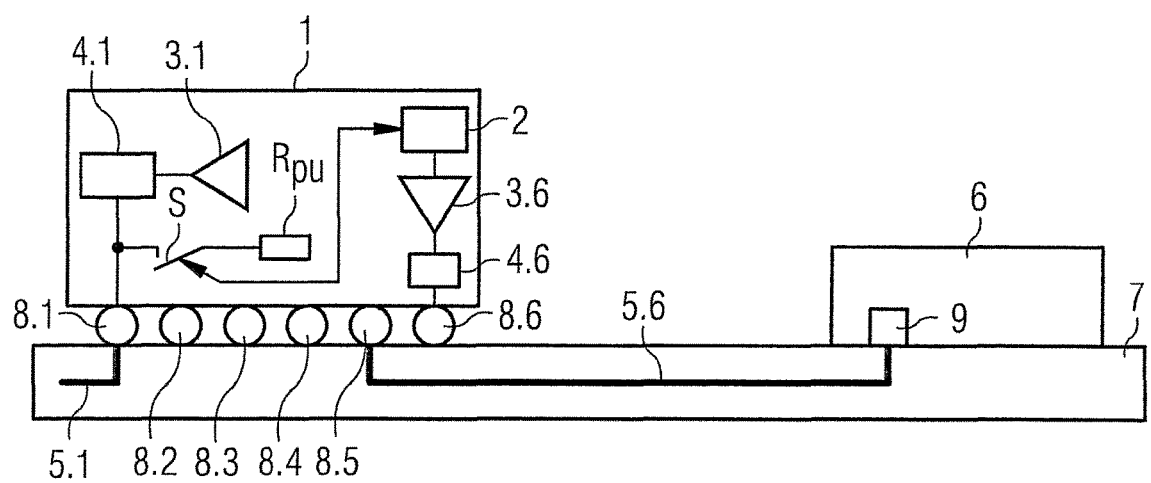
FIG. 1 shows a schematic representation of an embodiment of an arrangement of electronic components for implementing the method in accordance with the invention.

With reference to FIG. 1, which indicates a schematic representation of an arrangement of electronic components implementing the method in accordance with the invention, the arrangement comprises an electronic module 1, which is soldered to a printed circuit board 7. The electronic module 1 is, for instance, a chip formed as a ball grid array (BGA) package, which is fastened via solder balls 8 to the printed circuit board 7. These soldered connections 8 form part of contact lines 5, which each extend from contact terminals 4 of the electronic module 1 via the soldered connections 8 to the printed circuit board 7. The contact lines 5 are guided further on the printed circuit board 7 as conductor paths, where the contact lines 5 may lead to other electronic components, such as a further chip formed as a BGA package or an interface module.

In fact, the electronic module 1 includes a plurality of contact lines 5, which each extend from contact terminals 4 of the electronic module 1 to the printed circuit board 7, even if for the sake of clarity in FIG. 1, only one contact line 5.1 is depicted.

The contact line 5.1 depicted in FIG. 1 leads from a contact terminal 4.1 of the electronic module 1 via the soldered connection 8.1 to the printed circuit board 7.

The contact terminals 4 are also provided with a buffer 3, which is arranged in each case at the output of the electronic module 1 and which drives the relevant contact line 5 (in FIG. 1, the contact line 5.1, for instance) with its specific physical behavior.

FIG. 1 also shows a switch S, by which a pull-up resistor Rpu can be connected to the contact terminal 4.1. If the switch S is closed, so that the pull-up resistor Rpu was connected to the corresponding contact terminal 4.1, then the pull-up resistor Rpu "pulls" the corresponding contact terminal 4.1 to a positive operating voltage +UB. If a pull-down resistor Rpd is connected to the corresponding contact terminal 4.1, then the pull-down resistor pd "pulls" the corresponding contact terminal 4.1 to ground. In this way, level states that correspond to the logical value "0" or "1" can also be defined.

One important variable is the state that the contact terminals 4 (also referred to as "pins" or "ports") assume during a reset, i.e., during the switch-on process or when a reset button is actuated. Each individual contact terminal 4 generally has, in each case, a pull-up resistor Rpu or pull-down resistor Rpd, which can be activated or deactivated separately for each contact terminal 4. These "pull" resistors restrict the current that flows through the respective contact terminal 4 if the relevant contact terminal 4 is used as an input or output. If an external peripheral is to be controlled, it must likewise be known whether and how these "pull" resistors are configured.

Therefore, within the scope of the present invention, the use of an external storage unit 6 is implemented, which is connected via a contact line 5.6 and the soldered connection 8.6 to the contact terminal 4.6 of the electronic module 1. In turn, the contact terminal 4.6 is connected to a buffer 3.6 assigned thereto, which is controlled by a partial circuit 2 of the electronic module 1. After initiating the restart during the run-up process, the functional contact terminal 4.6 of the electronic module 1 that is connected to the contact line 5.6 to the storage unit 6 is converted into an I/O terminal. The partial circuit 2 continues to retrieve the adjustment information for the pull resistors, inter alia, for the pull-up resistor Rpu shown in FIG. 1, from the storage unit 6 and the switch S serves to adjust the pull resistors, inter alia, the switch S depicted in FIG. 1, in a desired manner.

For this purpose, the storage unit 6 can be formed extremely simply, because it is only required to keep the adjustment information for the pull resistors ready, inter alia, for the pull-up resistor Rpu shown in FIG. 1. Two bits are required to adjust a respective "pull" resistor. For transmission of the adjustment information, the storage unit 6 includes a voltage supply and a functional IO terminal 9, which is connected via a contact line 5.6 to the electronic module 1. After initiation of the restart during the run-up process, the I/O terminal 9 of the storage unit 6 connected to the contact line 5.6 to the electronic module 1 is firstly operated as an input, in order to be able to receive commands for transmitting the adjustment information from the partial circuit 2. After receiving such a command to transmit adjustment information from the partial circuit 2, the I/O terminal 9 is operated as an output during the run-up process, in order to be able to transmit the adjustment information to the electronic module 1. The storage unit 6 can also comprise an internal ring oscillator, which serves as a clock pulse.

To increase the data security, a test value for the data of the adjustment information can also be determined prior to transmitting the adjustment information, with the adjustment data being stored in the storage unit 6 and, when the adjustment information is retrieved, being transmitted by the electronic module 1 in addition to the adjustment information. With the aid of the test value, the error-free transmission and storage of the adjustment information is checked, where the run-up process is only completed with an error-free transmission and storage of the adjustment information. In a further embodiment, the adjustment information is transmitted in encrypted form between the storage unit 6 and the electronic module 1, where the run-up process is only completed with an error-free decryption of the adjustment information.

An external storage unit 6 is thus provided, in which adjustment information relating to the desired adjustments of the pull resistors, inter alia, for the pull-up resistor Rpu shown in FIG. 1, are stored. The electronic module 1 accesses this storage unit 6 during the run-up process and in this way obtains the desired adjustment information relating to the contact terminal 4.6 depicted in FIG. 1. The run-up process of the electronic module 1 and the other components of the electronic component group, i.e., possible interface modules, is extended for this purpose by the time required to transmit the adjustment information from the storage unit 6. The partial circuit 2 of the electronic module 1 which, for this purpose, communicates with the external storage unit 6, for this purpose, is dismissed earlier from the run-up process and brought into an operationally ready state. The run-up process of the electronic module 1 and other electronic components of the relevant component group is, however, only completed after successful adjustment of the respective "pull" resistors based on the retrieved adjustment information. If a number of "pull" resistors have to be adjusted for a plurality of contact terminals 4, then the run-up process is only completed after successful adjustment of all desired "pull" resistors based on the retrieved adjustment information.

A method for adjusting the pull resistors of an electronic module 1, which reliably prevents an unwanted adjustment of the pull resistors after a reset of the electronic module 1 and in particular ensures that the pull resistors of the electronic module 1 are already adjusted correctly immediately after the reset, is thus provided with via the disclosed embodiments of the invention. Here, an application-dependent protective circuit of the circuit board with pull resistors can be omitted, as a result of which cost advantages result. The prompt correct adjustment of the pull resistors for the contact terminals 4 after a reset is instead not reached by hardware measures but, instead, by corresponding programming of the electronic module 1.

Figure 2:
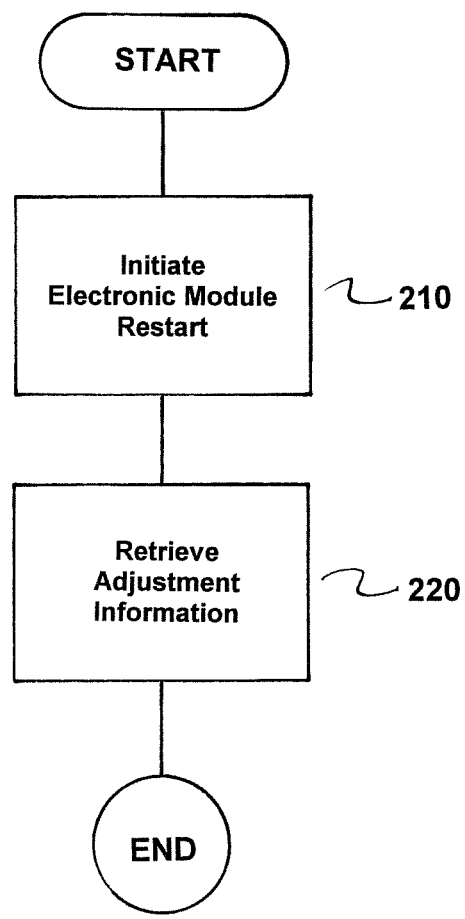
FIG. 2 is a flowchart of the method in accordance with the invention.

FIG. 2 is a flowchart of a method for adjusting a pull resistor (Rpu) on a contact terminal (4) of an electronic module (1), i.e., an application specific integrated circuit (ASIC), arranged on a printed circuit board (7) after initiation of a restart of the electronic module (1), which during a run-up process moves the electronic module (1) from a switched-off state into a switched-on state. The method comprises initiating the restart of the electronic module (1) during the run-up process from a partial circuit (2) which is arranged on the electronic module (1) and which is operationally ready during the run-up process, as indicated in step 210. Next, adjustment information relating to a desired adjustment of the pull resistor (Rpu) is retrieved from a storage unit (6) arranged on the printed circuit board (7) outside of the electronic module (1) and transmitted via a contact line (5.6) between the electronic module (1) and the storage unit (6), after the restart initiated the during the run-up process from the partial circuit (2) which is arranged on the electronic module (1) and which is operationally ready during the run-up process, as indicated in step 220.

In accordance with the invention, the run-up process of the electronic module (1) is only completed after successful adjustment of the respective pull resistor (Rpu) based the retrieved adjustment information.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for adjusting a pull resistor on a contact terminal of an electronic module arranged on a printed circuit board after initiation of a restart of the electronic module, which during a run-up process changes the electronic module from a switched-off state into a switched-on state, the method comprising:

initiating the restart of the electronic module during the run-up process from a partial circuit which is arranged on the electronic module and which is operationally ready during the run-up process; and retrieving adjustment information relating to a desired adjustment of the pull resistor from a storage unit arranged on the printed circuit board and externally outside of the electronic module, said adjustment information being transmitted via a contact line between the electronic module and the storage unit, after said restart initiated during the run-up process from the partial circuit which is arranged on the electronic module and which is operationally ready during the run-up process;

wherein the run-up process of the electronic module is only completed after successful adjustment of the respective pull resistor based the retrieved adjustment information.

2. The method as claimed in claim 1, wherein after initiating the restart, an input/output (I/O) terminal of the storage unit connected to the contact line to the electronic module is operated as an input during the run-up process and is operated as an output after receiving a command from the partial circuit of the electronic module to transmit the adjustment information during the run-up process.

3. The method as claimed in claim 1, wherein after initiating the restart during the run-up process, a further contact terminal of the electronic module connected to the contact line to the storage unit is converted into an input/output (I/O) terminal.

4. The method as claimed in claim 2, wherein after initiating the restart during the run-up process, a further contact terminal of the electronic module connected to the contact line to the storage unit is converted into an input/output (I/O) terminal.

5. The method as claimed in claim 1, wherein when the adjustment information is transmitted, a test value for the data of the adjustment information is also transmitted, with which, after the adjustment information is retrieved by the electronic module, a check for error-free transmission and storage of the adjustment information is performed, wherein the run-up process is only completed with an error-free transmission and storage of the adjustment information.

6. The method as claimed in claim 2, wherein when the adjustment information is transmitted, a test value for the data of the adjustment information is also transmitted, with which, after the adjustment information is retrieved by the electronic module, a check for error-free transmission and storage of the adjustment information is performed, wherein the run-up process is only completed with an error-free transmission and storage of the adjustment information.

7. The method as claimed in claim 3, wherein when the adjustment information is transmitted, a test value for the data of the adjustment information is also transmitted, with which, after the adjustment information is retrieved by the electronic module, a check for error-free transmission and storage of the adjustment information is performed, wherein the run-up process is only completed with an error-free transmission and storage of the adjustment information.

8. The method as claimed in claim 1, wherein the adjustment information is transmitted encrypted and authenticated between the storage unit and the electronic module; and wherein the run-up process is only completed with an error-free decryption and authentication check of the adjustment information.

9. The method as claimed in claim 1, wherein the electronic module comprises an application specific integrated circuit (ASIC).

* * * * *